United States Patent
Ogawa et al.

(10) Patent No.: US 9,966,824 B2
(45) Date of Patent: May 8, 2018

(54) MAGNETIC INDUCTOR ELECTRIC MOTOR AND MANUFACTURING METHOD THEREFOR

(71) Applicant: MITSUBISHI ELECTRIC CORPORATION, Chiyoda-ku (JP)

(72) Inventors: Toru Ogawa, Chiyoda-ku (JP); Hideaki Arita, Chiyoda-ku (JP); Akihiro Daikoku, Chiyoda-ku (JP); Taiga Komatsu, Chiyoda-ku (JP); Yoshihiro Miyama, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 197 days.

(21) Appl. No.: 15/029,748

(22) PCT Filed: Jul. 16, 2014

(86) PCT No.: PCT/JP2014/068930
§ 371 (c)(1),
(2) Date: Apr. 15, 2016

(87) PCT Pub. No.: WO2015/098159
PCT Pub. Date: Jul. 2, 2015

(65) Prior Publication Data
US 2016/0248308 A1 Aug. 25, 2016

(30) Foreign Application Priority Data
Dec. 25, 2013 (JP) .................... 2013-266677

(51) Int. Cl.
*H02K 21/26* (2006.01)
*H02K 21/44* (2006.01)
(Continued)

(52) U.S. Cl.
CPC .............. *H02K 21/26* (2013.01); *H02K 1/17* (2013.01); *H02K 1/24* (2013.01); *H02K 3/18* (2013.01);
(Continued)

(58) Field of Classification Search
CPC .......... H02K 1/14; H02K 1/145; H02K 1/146; H02K 1/17; H02K 1/27; H02K 1/272;
(Continued)

(56) References Cited

U.S. PATENT DOCUMENTS 3,293,459 A * 12/1966 Kreuter ................. H02K 37/20
310/163
4,385,251 A * 5/1983 Mallick ................. H02K 19/20
310/178
(Continued)

FOREIGN PATENT DOCUMENTS

JP 08-214519 A 8/1996
JP 11-133894 A 5/1999
(Continued)

OTHER PUBLICATIONS

International Search Report dated Oct. 7, 2014, in PCT/JP2014/068930 filed Jul. 16, 2014.

*Primary Examiner* — Tran Nguyen
(74) *Attorney, Agent, or Firm* — Oblon, McClelland, Maier & Neustadt, L.L.P.

(57) ABSTRACT

A first stator core and a second stator ore are configured by arranging core block pairs into an annular shape, the core block pairs being configured by stacking together core blocks so as to be spaced apart axially, each of the core blocks including a core back portion and one tooth, and a permanent magnet is configured so as to be divided into a plurality of magnet blocks that each include: a base portion; one shaft portion that protrudes radially inward from an
(Continued)

inner circumferential surface of the base portion; and flange portions that protrude on two circumferential sides from a radially inner end portion of the shaft portion, the magnet blocks being held between the core block pairs such that the base portion and the shaft portion are positioned inside the core block pairs and such that the flange portions protrude circumferentially from the core block pairs.

10 Claims, 12 Drawing Sheets

(51) Int. Cl.
*H02K 1/17* (2006.01)
*H02K 1/24* (2006.01)
*H02K 3/18* (2006.01)
*H02K 15/02* (2006.01)
*H02K 15/03* (2006.01)
*H02K 15/04* (2006.01)

(52) U.S. Cl.
CPC ........... *H02K 15/022* (2013.01); *H02K 15/03* (2013.01); *H02K 15/04* (2013.01); *H02K 21/44* (2013.01)

(58) Field of Classification Search
CPC ........ H02K 1/2726; H02K 1/24; H02K 1/246; H02K 15/02; H02K 15/022; H02K 15/03; H02K 15/04; H02K 19/10; H02K 19/103; H02K 21/04; H02K 21/046; H02K 21/26
See application file for complete search history.

(56) References Cited

U.S. PATENT DOCUMENTS

| | | | | |
|---|---|---|---|---|
| 5,504,382 A | * | 4/1996 | Douglass | H02K 1/278 310/114 |
| 5,672,925 A | * | 9/1997 | Lipo | H02K 19/103 310/154.11 |
| 5,682,073 A | * | 10/1997 | Mizuno | H02K 21/046 310/156.25 |
| 8,648,514 B2 | * | 2/2014 | Arita | H02K 9/06 310/112 |
| 8,749,105 B2 | * | 6/2014 | Arita | H02K 1/145 310/112 |
| 9,225,207 B2 | * | 12/2015 | Arita | H02K 21/44 310/181 |
| 2011/0070108 A1 | * | 3/2011 | Arita | H02K 9/06 417/410.1 |
| 2014/0354101 A1 | * | 12/2014 | Goto | H02K 21/44 310/156.02 |

FOREIGN PATENT DOCUMENTS

| | | |
|---|---|---|
| JP | 2002-136003 A | 5/2002 |
| JP | 2011-91920 A | 5/2011 |
| JP | 2012-228104 A | 11/2012 |
| JP | 2012-257409 A | 12/2012 |
| WO | WO 2009/136574 A1 | 11/2009 |
| WO | WO 2013/153575 A1 | 10/2013 |

\* cited by examiner

MAGNETIC INDUCTOR ELECTRIC MOTOR AND MANUFACTURING METHOD THEREFOR

TECHNICAL FIELD

The present invention relates to a magnetic inductor electric motor that is used in applications such as electrically assisted turbochargers that are driven in a high-speed rotational region, and to a manufacturing method therefor.

BACKGROUND ART

Permanent-magnet synchronous electric motors in which a permanent magnet that functions as a magnetic field means is mounted to a rotor are known conventionally. However, in electric motors that are used in "electrically assisted turbochargers" in which the electric motor is disposed between a turbine and a compressor of an automotive supercharger, since high-speed rotation that exceeds 100,000 revolutions per minute is required, problems with magnet holding strength arise if conventional permanent magnet electric motors are used in these electric motors.

In consideration of these conditions, conventional magnetic inductor electric motors have been proposed in which a permanent magnet that functions as a magnetic field means are disposed on a stator, and a rotor is configured such that two rotor cores to which gearwheel-shaped magnetic saliency is applied are disposed so as to be lined up axially so as to be offset circumferentially by a pitch of half a pole (see Patent Literature 1, for example). Because these rotors are constituted only by iron members that have a simple shape, high resistant strength against centrifugal forces is obtained. Thus, conventional magnetic inductor electric motors are used in applications that require high-speed rotation such as electrically assisted turbochargers, electrically driven compressors, etc.

CITATION LIST

Patent Literature

Patent Literature Japanese Patent Laid-Open No. HEI 8-214519 (Gazette)

Patent Literature 2: Japanese Patent Laid-Open No. 2011-91920 (Gazette)

SUMMARY OF THE INVENTION

Problem to be Solved by the Invention

In magnetic inductor electric motors of this kind, because two rotor cores are disposed so as to line up in an axial direction, twice the axial dimensions are required structurally than in conventional permanent magnet synchronous electric motors. Thus, when a rotating shaft of the rotor is rotatably supported by bearings that are disposed at two axial ends of the rotor, "axial resonance", in which the rotating shaft constitutes a resonance system and flexes and vibrates, is more likely to occur. The longer the interval between the hearings, and the faster the rotational speed of the rotor, the more likely that this axial resonance is to arise, and in the worst cases, the rotor will contact the stator. Thus, restricting the interval between the bearings to increase the rotational speed at which axial resonance arises is effective as a countermeasure to avoid contact between the rotor and the stator during super-high-speed rotation.

If a magnetic inductor electric motor of this kind is used in an automotive supercharger, then increased output is required from the magnetic inductor electric motor. Increasing the volume of the permanent magnet and increasing the number of turns in the stator coil are conceivable as measures for increasing the output of the magnetic inductor electric motor.

Thus, in conventional magnetic inductor electric motors, it is conceivable that the volume of the magnet may be increased by increasing the axial thickness of the permanent magnet to increase output. However, because the permanent magnet is disposed so as to be sandwiched between first and second stator cores from two axial ends, increasing the axial thickness of the permanent magnet leads to increases in axial dimensions of the stator. Thus, increasing the axial thickness of the permanent magnet leads to increases in axial dimensions of the stator, and in turn the rotor, generating new problems such as issues of axial resonance arising.

Moreover, the number of turns in the stator coil is not mentioned in conventional magnetic inductor electric motors.

The present invention aims to solve the above problems and an object of the present invention is to provide a magnetic inductor electric motor and a manufacturing method therefor that has coils that are wound into concentrated windings, and that enables improvements in output by making flange portions protrude on two circumferential sides from radially inner end portions of shaft portions of a permanent magnet to increase magnet volume without increasing axial dimensions.

Means for Solving the Problem

A magnetic inductor electric motor according to the present invention includes: a housing that is produced using a nonmagnetic material; a stator including: a stator core that is configured such that a first stator core and a second stator core that are produced so as to have identical shapes in which teeth are each formed so as to have a tapered shape in which a circumferential width becomes gradually narrower radially inward and are disposed at a uniform angular pitch circumferentially so as to project radially inward from an inner circumferential surface of a cylindrical core back are disposed coaxially so as to be separated axially and such that circumferential positions of the teeth are aligned, such that slots are configured into open slots; and a plurality of concentrated winding coils that are each produced by winding a jointless, continuous conductor wire into a concentrated winding on a pair of the teeth that face each other in an axial direction of the stator core, the stator being disposed inside the housing; a rotor in which a first rotor core and a second rotor core that are produced so as to have identical shapes in which salient poles are disposed so as to project at a uniform angular pitch circumferentially on an outer circumferential surface of a cylindrical base portion are fixed coaxially to a rotating shaft so as to be positioned on inner circumferential sides of the first stator core and the second stator core, respectively, and so as to be offset circumferentially by a pitch of half a salient pole from each other, the rotor being disposed rotatably inside the housing; and a permanent magnet that is disposed between the first stator core and the second stator core, and that generates field magnetic flux such that the salient poles of the first rotor core and the salient poles of the second rotor core have different polarity. The first stator core and the second stator core are configured by arranging core block pairs into an annular shape such that circumferential side surfaces of circular arc-shaped core back portions contact each other, the core block pairs being configured by stacking together core blocks so as to be spaced apart axially, each of the core blocks including the core back portion and one of the teeth, which protrudes radially inward from an inner circumferential surface of the core back portion, and the permanent magnet is configured so as to be divided into a plurality of magnet blocks that each include: a circular arc-shaped base portion; one shaft portion that protrudes radially inward from an inner circumferential surface of the base portion; and flange portions that protrude on two circumferential sides from a radially inner end portion of the shaft portion, the magnet blocks being held between the core block pairs such that the base portion and the shaft portion are positioned inside the core block pairs and such that the flange portions protrude circumferentially from the core block pairs.

Effects of the Invention

According to the present invention, because the concentrated winding coils are wound into concentrated windings, and the magnet blocks have flange portions that protrude on two circumferential sides from radially inner end portions of shaft portions, output can be increased without increasing axial dimensions of the electric motor. Because the teeth of the core blocks are produced into a tapered shape, and the core blocks do not have flange portions that protrude on two circumferential sides from the radially inner end portions of the teeth, the concentrated winding coils can be mounted to the pairs of teeth so as to have a high space factor.

DESCRIPTION OF EMBODIMENTS

Embodiment 1

Figure 1:
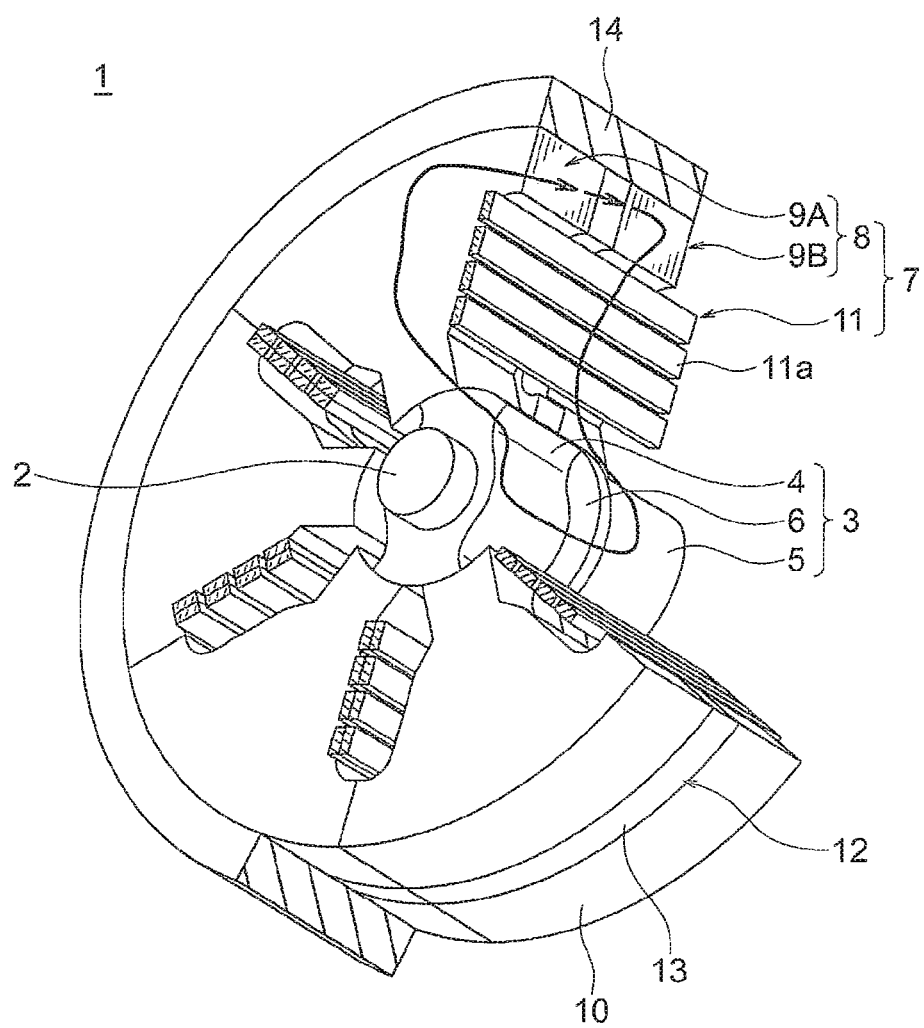
FIG. 1 is a partially cut away oblique projection that shows an overall configuration of a magnetic inductor electric motor according to Embodiment 1 of the present invention.
Figure 2:
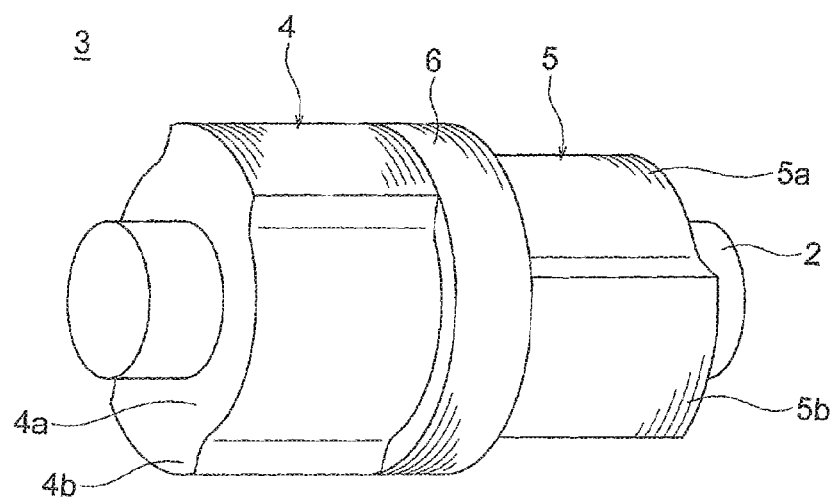
FIG. 2 is an oblique projection that shows a rotor in the magnetic inductor electric motor according to Embodiment 1 of the present invention.
Figure 3:
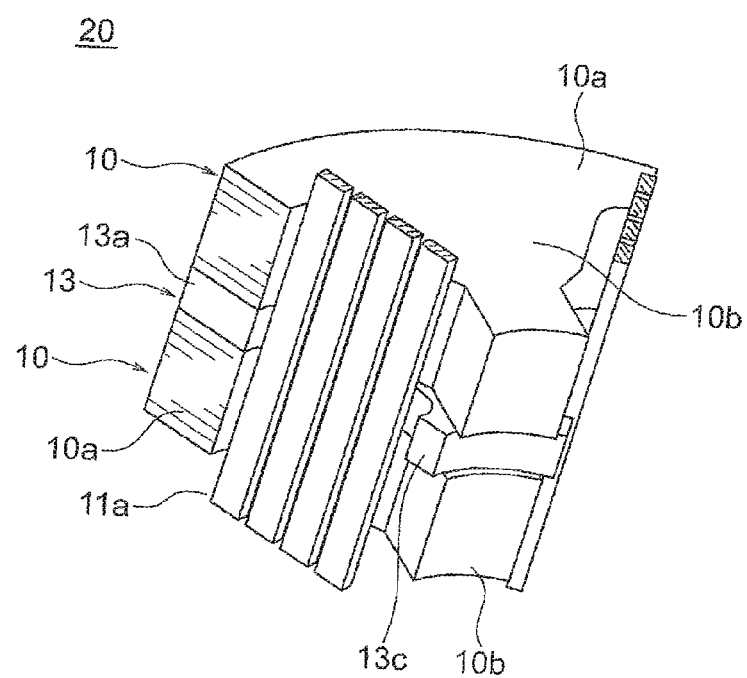
FIG. 3 is a partially cut away oblique projection that shows a stator assembly in the magnetic inductor electric motor according to Embodiment 1 of the present invention.
Figure 4:
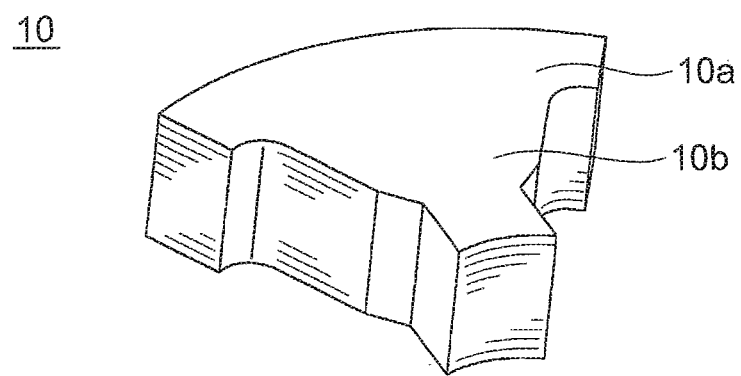
FIG. 4 is an oblique projection that shows a core block in the magnetic inductor electric motor according to Embodiment 1 of the present invention.
Figure 5:
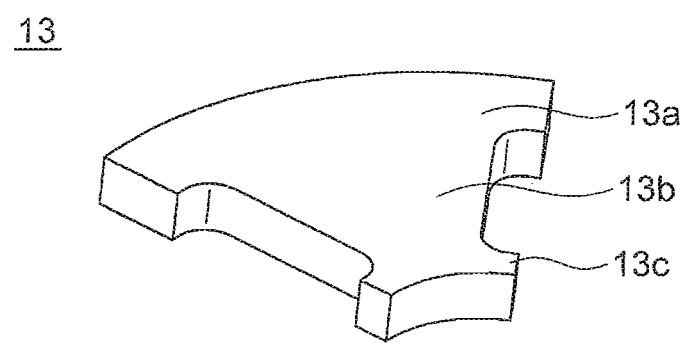
FIG. 5 is an oblique projection that shows a magnet block in the magnetic inductor electric motor according to Embodiment 1 of the present invention.

FIG. 1 is a partially cut away oblique projection that shows an overall configuration of a magnetic inductor electric motor according to Embodiment 1 of the present invention, FIG. 2 is an oblique projection that shows a rotor in the magnetic inductor electric motor according to Embodiment 1 of the present invention, FIG. 3 is a partially cut away oblique projection that shows a stator assembly in the magnetic inductor electric motor according to Embodiment 1 of the present invention, FIG. 4 is an oblique projection that shows a core block in the magnetic inductor electric motor according to Embodiment 1 of the present invention, and FIG. 5 is an oblique projection that shows a magnet block in the magnetic inductor electric motor according to Embodiment 1 of the present invention. Moreover, for simplicity, portions of concentrated winding coils and insulators have been omitted from FIGS. 1 and 3.

In FIG. 1, a magnetic inductor electric motor 1 includes: a rotor 3 that is fixed coaxially to a rotating shaft 2 that is produced using a solid magnetic body of iron, etc.; a stator 7 that is formed by mounting a stator coil 11 that functions as a torque generating driving coil to a stator core 8 that is disposed so as to surround the rotor 3; a permanent magnet 12 that functions as a field means; and a housing 14 that houses the rotor 3, the stator 7, and the permanent magnet 12.

As shown in FIG. 2, the rotor 3 includes: first and second rotor cores 4 and 5 that are prepared by laminating and integrating a large number of magnetic steel plates that are formed into a prescribed shape; and a disk-shaped partitioning wall 6 that is prepared by laminating and integrating a plurality of magnetic steel plates, and through a central axial position of which a rotating shaft insertion aperture (not shown) is disposed. The first and second rotor cores 4 and 5 are produced so as to have identical shapes, and are constituted by: cylindrical base portions 4a and 5a through a central axial position of which rotating shaft insertion apertures are disposed; and two salient poles 4b and 5b that project radially outward from outer circumferential surfaces of the base portions 4a and 5a, that are disposed so as to extend axially, and that are disposed at a uniform angular pitch circumferentially.

The first and second rotor cores 4 and 5 are offset circumferentially by a pitch of half a salient pole, so as to be disposed in contact with each other so as to have the partitioning wall 6 interposed, and so as to be fixed to the rotating shaft 2 that is inserted into their rotating shaft insertion apertures, to constitute the rotor 3. The rotor 3 is rotatably disposed inside the housing 14 such that two ends of the rotating shaft 2 are supported by bearings (not shown).

The stator core 8 includes first and second stator cores 9A and 9B that are produced so as to have identical shapes. The first and second stator cores 9A and 9B include: a cylindrical core back; and six teeth 10b that each project radially inward from an inner circumferential surface of the core back at a uniform angular pitch circumferentially. Slots 10c that have openings on an inner circumferential side are formed by the core back and adjacent teeth 10b. The first and second stator cores 9A and 9B are disposed inside the housing 14 so as to line up in an axial direction such that circumferential positions of the teeth 10b are aligned, so as to be separated axially, and so as to surround the first and second rotor cores 4 and 5, respectively. The slots 10c of this stator core 8 have no flange portions on radially inner end portions of the teeth 10b, and are configured into open slots.

The first and second stator cores 9A and 9B are each divided into six equal sections so as to be constituted by six core blocks 10. As shown in FIG. 4, the core blocks 10 include: a circular arc-shaped core back portion 10a; and a tooth 10b that protrudes radially inward from a circumferentially central position of an inner circumferential surface of the core back portion 10a, and that has a tapered shape in which a circumferential width becomes gradually narrower radially inward, and are produced by laminating and integrating a large number of magnetic steel plates that have an approximate T shape. The first and second stator cores 9A and 9B are each configured by arranging six core blocks 10 into an annular shape such that circumferential side surfaces of the core back portions 10a are butted together. The six core back portions 10a are arranged into an annular shape to constitute the core backs of the first and second stator cores 9A and 9B.

The permanent magnet 12 is constituted by six magnet blocks 13. As shown in FIG. 5, the magnet blocks 13 are formed into approximately T-shaped solid bodies that have uniform thickness, that include: a circular arc-shaped base portion 13a; a shaft portion 13b that protrudes radially inward from an inner circumferential surface of the base portion 13a; and flange portions 13c that protrude on two circumferential sides from the protruding end (an radially inner end portion) of the shaft portion 13b. The base portions 13a are formed so as to have an external shape that is similar or identical to that of the core back portions 10a. The shaft portions 13b are formed so as to have an external shape that is similar or identical to that of the teeth 10b except that a radial length is slightly shorter than that of the teeth 10b.

As shown in FIG. 3, the magnet block 13 is held between a pair of core blocks 10 such that the base portion 13a is positioned between the core back portions 10a, and the shaft portion 13b is positioned between the teeth 10b. Here, the magnet block 13 is disposed between the pair of core blocks 10 such that the base portion 13a and the shaft portion 13b do not protrude from between the pair of core blocks 10, and the flange portions 13c protrude on two circumferential sides from radially inner end portions of the teeth 10b. The magnet block 13 is magnetized axially such that two surfaces that contact the pair of core blocks 10 form North-seeking (N) poles and South-seeking (S) poles.

Thus, the stator coil 11 has six concentrated winding coils 11a that are each produced by winding a rectangular conducting wire that is made of jointless, continuous copper or aluminum that is coated with an insulating enamel resin, for example, for four turns helically into a flatwise winding on teeth 10b that form pairs that face each other axially without spanning the slots 10c. The concentrated winding coils 11a are mounted onto the pairs of facing teeth 10b of the pairs of core blocks 10 that hold the magnet blocks 13 from opposite sides so as to have insulators (not shown) interposed to constitute stator assemblies 20, as shown in FIG. 3.

Six stator assemblies 20 that have been configured in this manner are arranged into an annular shape such that circumferential side surfaces of the core back portions 10a are butted against each other, and are inserted into and fixed to the housing 14, to produce the stator 7. The housing 14 is disposed so as to be in close contact with an outer circumferential surface of the core back of the first stator core 9A and an outer circumferential surface of the core back of the second stator core 9B. The housing 14 is produced using a non-magnetic body, and is configured so as not to short the magnetic path of the permanent magnet 12.

The stator coil 11 is configured into a three-phase alternating-current winding by connecting the six concentrated winding coils 11a in order of arrangement in the circumferential direction as a U-phase coil, a V-phase coil, a W-phase coil, a U-phase coil, a V-phase coil, and a W-phase coil, for example.

The first and second stator cores 9A and 9B are configured by arranging core blocks 10 that have an approximate T shape that includes a circular arc-shaped core back portion 10a and a tooth 10b into an annular shape such that circumferential side surfaces of the core back portions 10a are butted against each other. Thus, the core back portions 10a of adjacent core blocks 10 contact each other, ensuring circumferential magnetic paths for the magnetic flux that is generated by the stator coil 11.

Next, operation of a magnetic inductor electric motor 1 that is configured in this manner will be explained.

As indicated by arrows in FIG. 1, magnetic flux from the permanent magnet 12 enters the second stator core 9B, flows through the second stator core 9B radially inward, and from a tooth 10b enters the salient pole 5b of the second rotor core 5 that faces the tooth 10b. Then the magnetic flux that has entered the second rotor core 5 flows radially inward through the second rotor core 5, and then a portion thereof flows axially through the base portion 5a of the second rotor core 5, and a remaining portion flows axially through the rotating shaft 2 and enters the first rotor core 4. The magnetic flux that has entered the first rotor core 4 flows radially outward through the first rotor core 4, and enters a tooth 10b of the first stator core 9A from the salient pole 4b. The magnetic flux that has entered the first stator core 9A flows radially outward through the first stator core 9A, and then flows axially through the first stator core 9A, and returns to the permanent magnet 12.

Here, because the salient poles 4b and 5b of the first and second rotor cores 4 and 5 are offset by a pitch of half a salient pole circumferentially, the magnetic flux acts such that North-seeking (N) poles and South-seeking (S) poles are disposed alternately in a circumferential direction when viewed from an axial direction. Torque is generated by passing an alternating current to the stator coil 11 in response to the rotational position of the rotor 3. Thus, the magnetic inductor electric motor 1 operates as a noncommutator motor, and operates magnetically as a four-pole, six-slot permanent-magnet synchronous motor.

According to Embodiment 1, because the concentrated winding coils 11a that constitute the stator coil 11 are wound for four turns, output for identical electric currents at identical rotational frequencies can be increased compared to when concentrated winding coils are wound for a single turn. Because the magnet blocks 13 have flange portions 13c that protrude on two circumferential sides from the radially inner end portions of the shaft portions 13b, magnet volume can be increased. Thus, the amount of magnetic flux that is induced in the salient poles 4b and 5b of the first and second rotor cores 4 and 5 is increased, increasing the rotational driving force that is generated in the first and second rotor cores 4 and 5. A high-output magnetic inductor electric motor 1 that can be used in automotive superchargers can be achieved thereby. Moreover, in Embodiment 1, the number of turns in the concentrated winding coils 11a is four turns, but the number of turns in the concentrated winding coils 11a may be one turn if the output therefrom is sufficient.

Because the flange portions 13c are formed so as to protrude circumferentially from the radially inner end portions of the shaft portions 13b, there is no increase in axial dimensions of the stator 7, enabling the occurrence of axial resonance problems to be suppressed, and also enabling the mounting space for the concentrated winding coils 11a to be ensured.

Because the disk-shaped partitioning wall 6, which is produced using a magnetic material that has an axial width that is approximately equal to an axial width of the magnet blocks 13, and which has an outside diameter that is approximately equal to an outside diameter of the salient poles 4b and 5b is disposed between the first and second rotor cores 4 and 5, magnetic saturation can be alleviated.

Here, holding the stator core 8 firmly on the housing 14 is important from the viewpoint of suppressing vibration that results from magnetic attraction, etc., that is generated in the stator 7. Thus, it is desirable to increase the rigidity of the stator 7 by forming a cylindrical portion on the housing 14, and fixing the group of pairs of core blocks 10 that are arranged into an annular shape to the cylindrical portion of the housing 14 by press fitting or shrinkage fitting, to increase the fastening force on the group of pairs of core blocks 10.

Figure 6:
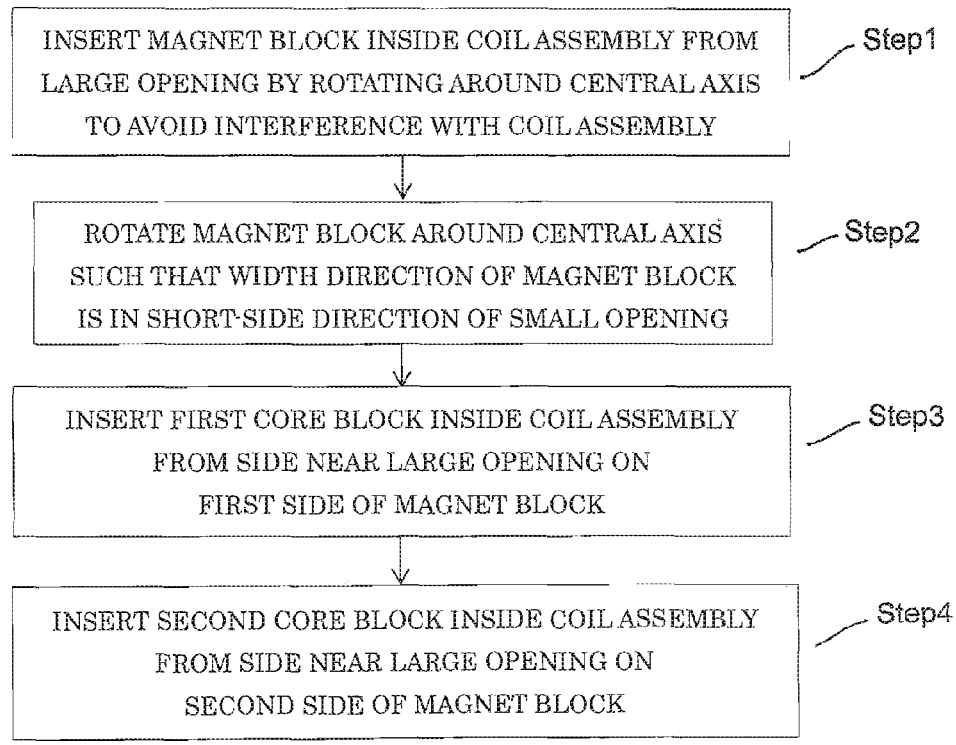
FIG. 6 is a flow chart that explains a manufacturing method for a stator of the magnetic inductor electric motor according to Embodiment 1 of the present invention.
Figure 8:
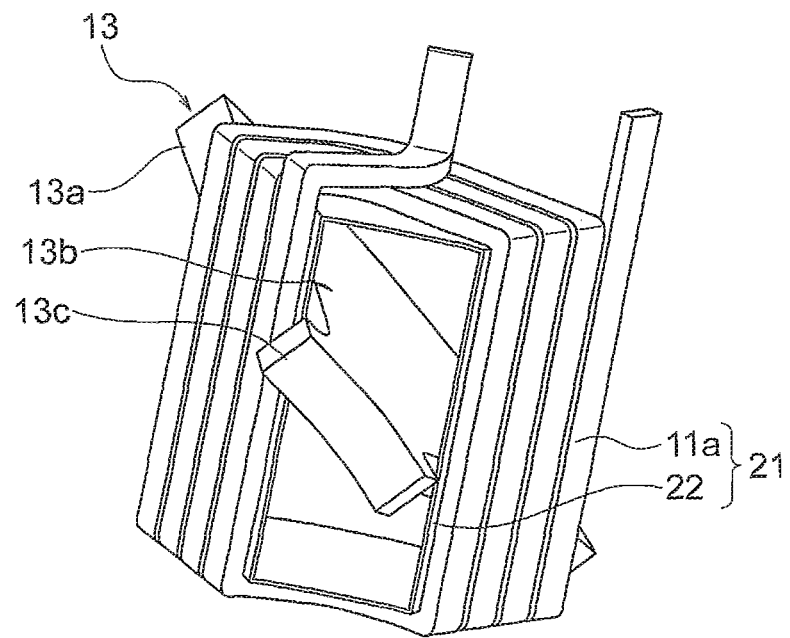
FIG. 8 is a diagram that explains a step of mounting a magnet block into a coil assembly in the manufacturing method for the stator of the magnetic inductor electric motor according to Embodiment 1 of the present invention.
Figure 9:
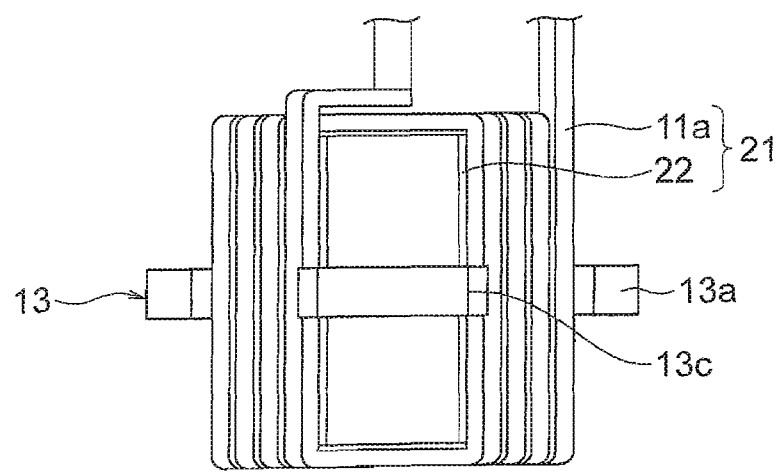
FIG. 9 is a diagram that explains the step of mounting the magnet block into the coil assembly in the manufacturing method for the stator of the magnetic inductor electric motor according to Embodiment 1 of the present invention.
Figure 10:
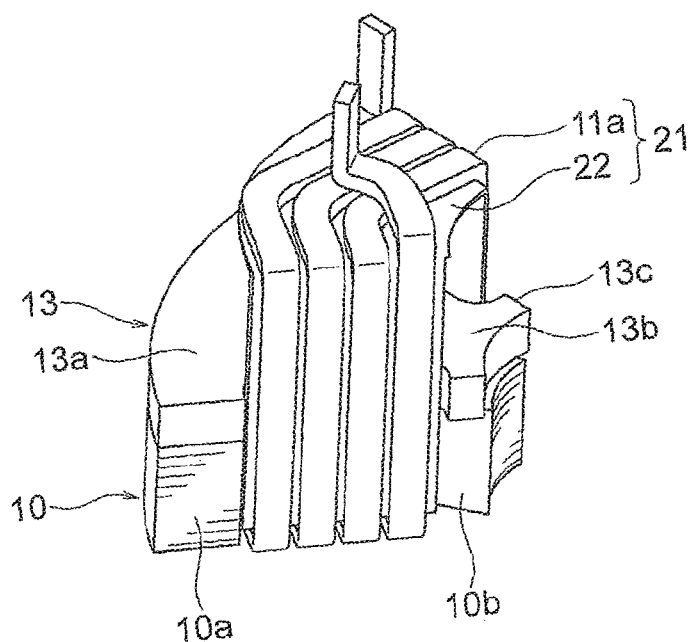
FIG. 10 is a diagram that explains a step of mounting a first core block into a coil assembly in the manufacturing method for the stator of the magnetic inductor electric motor according to Embodiment 1 of the present invention.
Figure 11:
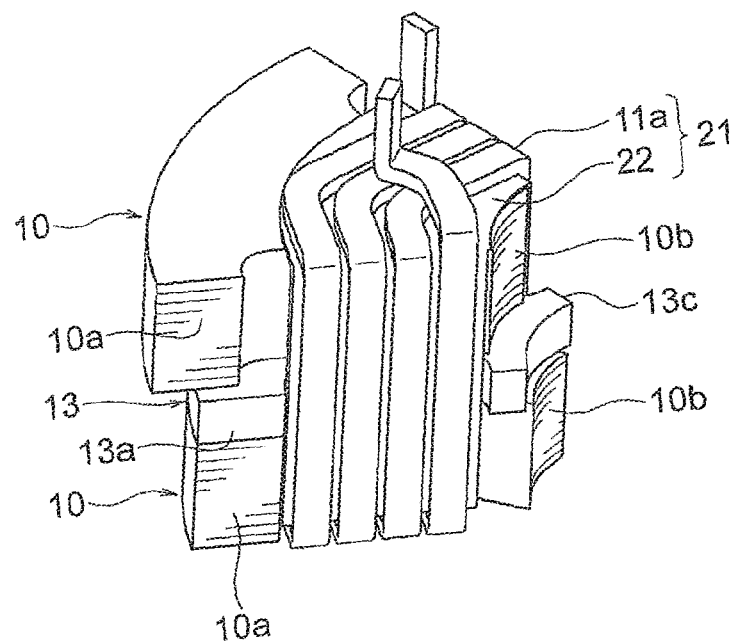
FIG. 11 is a diagram that explains a step of mounting a second core block into a coil assembly in the manufacturing method for the stator of the magnetic inductor electric motor according to Embodiment 1 of the present invention.

Next, a method for manufacturing the stator 7 will be explained. FIG. 6 is a flow chart that explains a manufacturing method for a stator of the magnetic inductor electric motor according to Embodiment 1 of the present invention, FIG. 7 is an oblique projection that shows a stator assembly in the magnetic inductor electric motor according to Embodiment 1 of the present invention, FIGS. 8 and 9 are both diagrams that explain a step of mounting a magnet block into a coil assembly in the manufacturing method for the stator of the magnetic inductor electric motor according to Embodiment 1 of the present invention, FIG. 10 is a diagram that explains a step of mounting a first core block into a coil assembly in the manufacturing method for the stator of the magnetic inductor electric motor according to Embodiment 1 of the present invention, and FIG. 11 is a diagram that explains a step of mounting a second core block into a coil assembly in the manufacturing method for the stator of the magnetic inductor electric motor according to Embodiment 1 of the present invention.

First, the core blocks 10, the magnet blocks 13, and the coil assemblies 21 are prepared.

Figure 7:
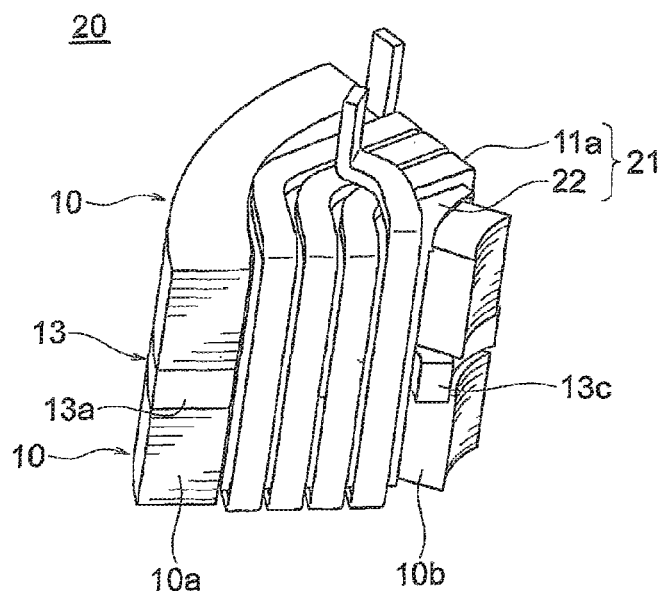
FIG. 7 is an oblique projection that shows a coil assembly in the magnetic inductor electric motor according to Embodiment 1 of the present invention.

As shown in FIG. 7, the coil assemblies 21 are produced by mounting a concentrated winding coil 11a in an externally fitted state onto an electrically insulating insulator 22 that is formed into a tubular body that approximately matches an external shape of a laminated body in which a shaft portion 13b is sandwiched between a pair of teeth 10b. Although not shown, the coil assemblies 21 are produced, for example, by winding the electrically insulating insulator 22 onto a winding mold that approximately matches the external shape of the laminated body in which the shaft portion 13b is sandwiched between the pair of teeth 10b, winding the rectangular conductor over the insulator 22 for four turns helically into a flatwise winding, and then pulling the concentrated winding coil 11a from the winding mold together with the insulator. A coil assembly 21 that is produced in this manner is configured so as to have a tubular body in which a short side of a rectangle becomes gradually longer in a direction that is perpendicular to both the short sides and the long sides of the rectangle. Here, for simplicity, the direction that is perpendicular to both the short sides and the long sides of the rectangle of the tubular body of the coil assembly 21, the longitudinal direction of the long sides of the rectangle, and the longitudinal direction of the short sides of the rectangle will be called "a radial direction", "an axial direction", and "a circumferential direction", respectively.

Next, the magnet block 13 is disposed radially outside a large opening (a radially outer opening) of the coil assembly 21 such that a central axis of the shaft portion 13b of the magnet block 13 that passes through centrally in the thickness direction and the width direction is aligned with the radial direction of the coil assembly 21, and an end near the flange portion 13c is oriented toward the coil assembly 21. Then, the magnet block 13 is rotated around the central axis such that the flange portions 13c fit inside a small opening (a radially inner opening) of the coil assembly 21 when viewed from radially inside. Next, the magnet block 13 is moved in the radial direction while maintaining the inclined attitude of the magnet block 13, and is inserted into the coil assembly 21 (STEP 1). As shown in FIG. 8, the magnet block 13 is thereby inserted into the coil assembly 21 such that the flange portions 13c protrude through the small opening.

Next, as shown in FIG. 9, the magnet block 13 is rotated around the central axis such that a direction of protrusion of the flange portions 13c is aligned with the circumferential direction, and the magnet block 13 is also positioned centrally in the axial direction of the coil assembly 21 (STEP 2).

Next, as shown in FIG. 10, the tooth 10b of a first of the core blocks 10 is inserted inside the coil assembly 21 from a side near the large opening of the coil assembly 21 on a first side of the magnet block 13 such that a central axis of the tooth 10b that passes through centrally in the thickness direction and the width direction is aligned with the radial direction of the coil assembly 21 (STEP 3).

Next, as shown in FIG. 11, the tooth 10*b* of a second of the core blocks 10 is inserted inside the coil assembly 21 from a side near the large opening of the coil assembly 21 on a second side of the magnet block 13 such that a central axis of the tooth 10*b* that passes through centrally in the thickness direction and the width direction is aligned with the radial direction of the coil assembly 21 (STEP 4). A stator assembly 20 is produced thereby.

Next, six stator assemblies 20 are arranged into an annular shape such that circumferential side surfaces of the core back portions 10*a* are butted against each other, and are inserted into and fixed to the housing 14, to produce the stator 7.

Now, in order to explain the effects of the present application, a conventional method for mounting concentrated winding coils to a stator core in which slots are configured into semi-closed slots that have flange portions on radially inner end portions of teeth will be explained. In Patent Literature 2, for example, edgewise coils were mounted onto the teeth by passing edgewise coils that have short sides that are larger than a circumferential width of flange portions that are formed on radially inner end portions of teeth over the flange portions such that the teeth are inserted therein, and then displacing the two long sides of the edgewise coil in opposite axial directions to reduce the length of the short sides of the edgewise coil. In a method such as that of Patent Literature 2, space factor can be increased, but axial dimensions of the edgewise coils are increased.

It is also conceivable to produce concentrated winding coils by mounting a plurality of U-shaped coil bodies onto teeth from a first axial end, and welding connecting coils that link together turns and end portions of the coil bodies that protrude at the second axial end. Space factor can also be increased in this method, but welding space is required at the second axial end of the teeth, increasing axial dimensions of the concentrated winding coils.

In Embodiment 1, the magnet block 13 is rotated around the central axis to avoid interference between the flange portions 13*c* and the coil assembly 21 and is inserted into the coil assembly 21 before a step of inserting the core blocks 10 into the coil assembly 21. In addition, the core blocks 10 are configured so as not to include flange portions on radially inner end portions of the teeth 10*b*, and the core blocks 10 are inserted sequentially inside the coil assembly 21 on two sides of the magnet block 13. The coil assembly 21 is thereby mounted so as to contact the pairs of teeth 10*b* of the core blocks 10 between which the magnet block 13 is sandwiched.

Thus, according to Embodiment 1, because coil assemblies 21 can be mounted onto pairs of core blocks 10 that have flange portions 13*c* on a radially inner side by a simple step such that increases in axial dimensions are suppressed while increasing space factor, stator assemblies 20 can be produced inexpensively. In addition, a magnetic inductor electric motor 1 is obtained that can suppress the occurrence of axial resonance problems.

Teeth 10*b* of core blocks 10 are formed so as to have a tapered shape in which a circumferential width becomes gradually narrower radially inward. Thus, slots 10*c* are formed so as to have rectangular cross-sections, enabling the concentrated winding coils 11*a* to be mounted so as to have a high space factor, and also facilitating insertion of the core blocks 10 on two sides of magnet blocks 13 inside the coil assemblies 21.

Figure 12:
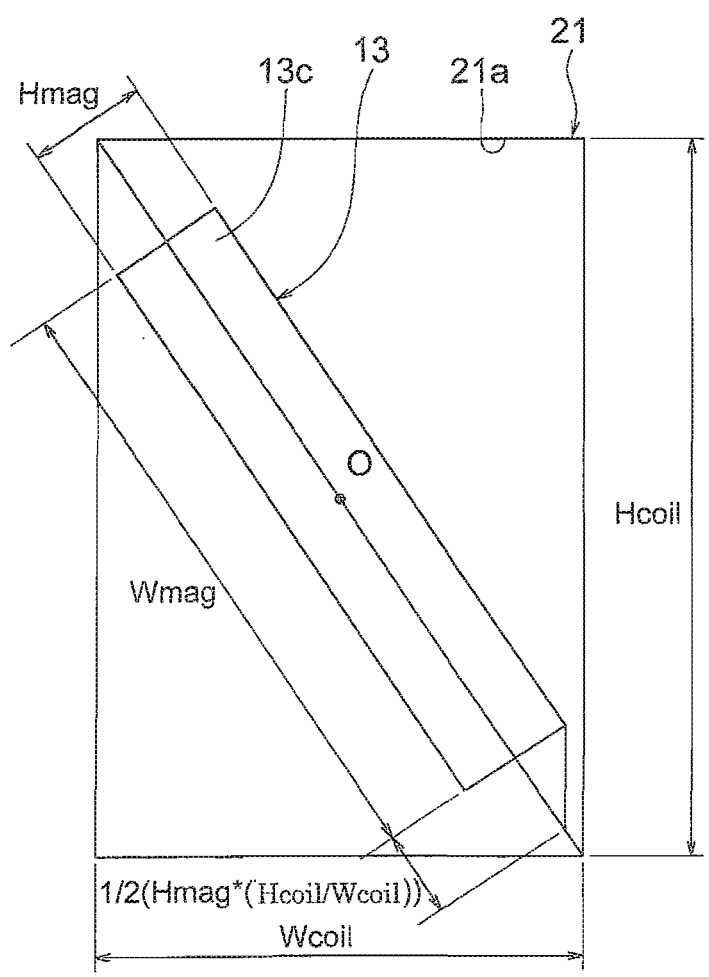
FIG. 12 is a schematic diagram that shows dimensional relationships between magnet blocks and coil assemblies in the magnetic inductor electric motor according to Embodiment 1 of the present invention.

Next, dimensional relationships between the tip end surfaces of the magnet blocks 13 and the small openings of the coil assemblies 21 will be explained with reference to FIG. 12. FIG. 12 is a schematic diagram that shows dimensional relationships between magnet blocks and coil assemblies in the magnetic inductor electric motor according to Embodiment 1 of the present invention.

Let an axial length of the small opening 21*a* that constitutes the radially inner opening of a coil assembly 21 be Hcoil, and a circumferential length thereof be Wcoil, and let an axial thickness of a radially inner end surface of a magnet block 13 be Hmag, and a circumferential length thereof be Wmag. Then, if the flange portions 13*c* are formed so as to satisfy Expression (1), the magnet block 13 can be rotated around a central axis that passes through the shaft portion 13*b* centrally in a width direction and a thickness direction to pass through the small openings 21*a*. Moreover, the radially inner opening of the concentrated winding coils 11*a* is substantially the small opening 21*a* of the coil assemblies 21.

$$W\text{mag} + \{H\text{mag} \times (H\text{coil}/W\text{coil})\} < (W\text{coil}^2 + H\text{coil}^2)^{1/2} \quad (1)$$

Now, in Embodiment 1 above, the coil assemblies 21 are produced into tubular bodies that have a similar or identical internal shape to the external shape of the laminated body in which the shaft portion 13*b* is sandwiched between the pair of teeth 10*b*, but the coil assemblies 21 may be produced into tubular bodies in which a spacing between two circumferential side surfaces (inclined surfaces) is slightly narrower than a spacing between two circumferential side surfaces of the laminated body. In that case, insertion of the core blocks 10 into the spaces on the two sides of the magnet block 13 inside the coil assemblies 21 is light press-fitting, and the core blocks 10 are inserted while expanding the spacing between the two circumferential side surfaces of the coil assemblies 21. Thus, the concentrated winding coils 11*a* and the insulators 22 deform so as to conform to the surface shapes of the two circumferential side surfaces of the teeth 10*b* of the core blocks 10, increasing contact area between the concentrated winding coils 11*a* and the teeth 10*b* via the insulators 22.

Heat that is generated in the concentrated winding coils 11*a* due to copper loss is thereby transferred to the core blocks 10 efficiently, improving cooling of the stator coil 11. Because the coupling strength between the coil assemblies 21 and the core blocks 10 and between the coil assemblies 21 and the magnet block 13 is increased, the stator assemblies 20 will not be disassembled during the transportation of the stator assemblies 20 or in the process of assembling the stator 7 due to the core blocks 10 and the magnet block 13 dislodging, etc., improving transportability of the stator assemblies 20 and workability during assembly of the stator 7. Moreover, because a risk arises that cracking of the magnet block 13 may occur if the insertion pressure on the core blocks 10 is large, it is preferable to set the dimensions of the coil assemblies 21 such that the insertion pressure is of a degree such that cracking does not occur in the magnet blocks 13.

Furthermore, coil assemblies 21 may be produced into tubular bodies in which not only the spacing between the two circumferential side surfaces but also spacing between the two axial side surfaces is slightly shorter than an axial stacked dimension of the laminated bodies in which shaft portions 13*b* are sandwiched between pairs of teeth 10*b*. In that case, insertion of the core blocks 10 should be light press-fitting such that not only the two circumferential side surfaces of the coil assemblies 21 but also the two axial side surfaces deform so as to conform to the two axial end surfaces of the laminated body of core blocks 10. Thus, contact area between the concentrated winding coils 11a and the teeth 10b via the insulators 22 is further increased, further improving cooling of the stator coil 11.

In Embodiment 1 above, the insulators 22 are formed into tubular bodies that have an internal shape that approximately matches an external shape of the laminated bodies in which the shaft portions 13b are sandwiched between the pairs of teeth 10b, but inside portions of the insulators 22 that hold the shaft portion 13b in a vicinity of an axial center may be formed into shapes that conform to the side surfaces of the shaft portion 13b of the magnet block 13. In that case, positional relationships between the first and second stator cores 9A and 9B and the first and second rotor cores 4 and 5 and between the permanent magnet 12 and the first and second rotor cores 4 and 5 are accurately determined in an axial direction, enabling irregularities in rotational driving force that are generated in the first and second rotor cores 4 and 5 as a result of irregularities in these positional relationships to be suppressed.

In Embodiment 1 above, it is possible to set the interfitting dimensions more accurately when the axial stacked dimension of the core blocks 10 and the magnet block 13 and the axial dimensions of the coil assemblies 21 are being set, due to the number of axial stacked dimensions of the core blocks 10 and the magnet block 13 being reduced.

Embodiment 2

Figure 13A:
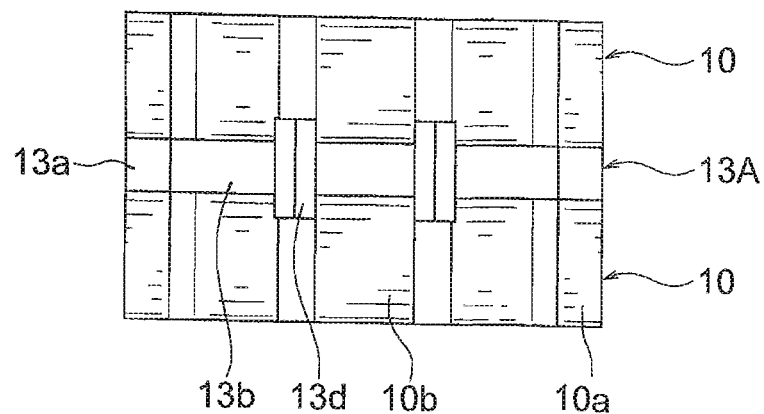
FIGS. 13A and 13B show diagrams that explain a configuration of a stator assembly in a magnetic inductor electric motor according to Embodiment 2 of the present invention.
Figure 13B:
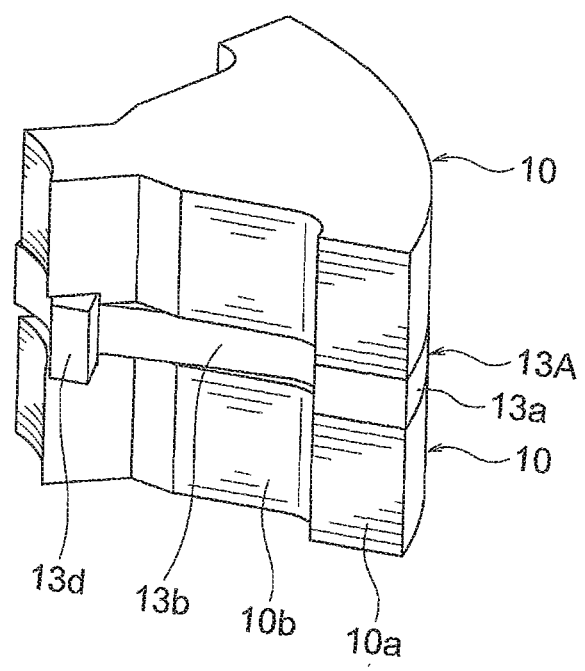

FIGS. 13A and 13B show diagrams that explain a configuration of a stator assembly in a magnetic inductor electric motor according to Embodiment 2 of the present invention, FIG. 13A being a plan when viewed from radially inside, and FIG. 13B being an oblique projection.

In FIGS. 13A and 13B, a magnet block 13A is formed such that an axial thickness of flange portions 13d that protrude on two circumferential sides from a radially inner end portion of a shaft portion 13b is thicker than an axial thickness of the shaft portion 13b.

Moreover, the rest of the configuration is formed in a similar or identical manner to that of Embodiment 1 above.

In Embodiment 2, the volume of the magnet block 13A is increased compared to Embodiment 1 above because the axial thickness of the flange portions 13d is thicker. Thus, the amount of magnetic flux that is induced in the salient poles 4b and 5b of the first and second rotor cores 4 and 5 is increased, further increasing the rotational driving force that is generated in the first and second rotor cores 4 and 5.

Embodiment 3

Figure 14:
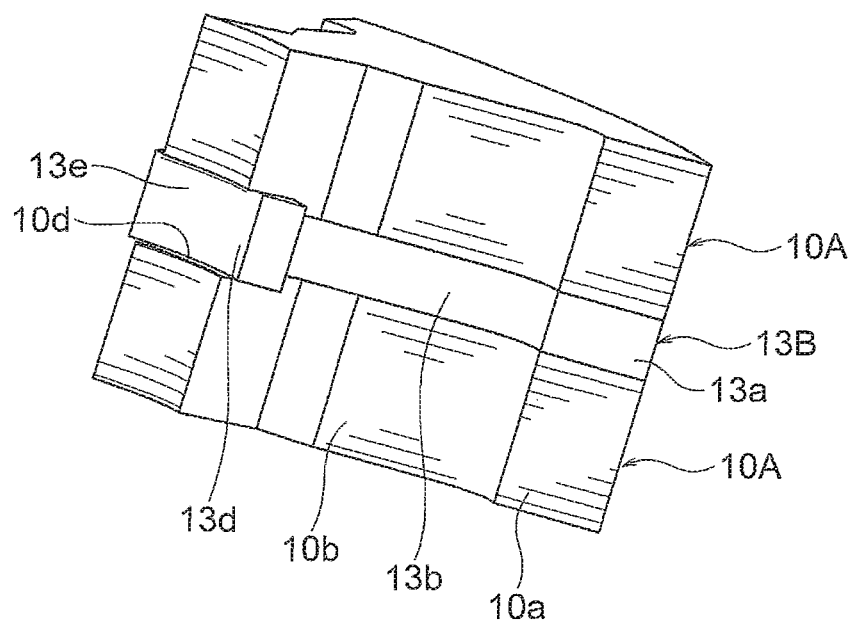
FIG. 14 is an oblique projection that shows a stator assembly in a magnetic inductor electric motor according to Embodiment 3 of the present invention.

FIG. 14 is an oblique projection that shows a stator assembly in a magnetic inductor electric motor according to Embodiment 3 of the present invention.

In FIG. 14, a magnet block 13B is formed such that an expanded portion 13e that has an axial thickness that is similar or identical to that of a pair of flange portions 13d links the flange portions 13d by increasing a thickness of a radially inner end portion of a shaft portion 13b. Recess portions 10d into which the expanded portion 13e is fitted are recessed into radially inner end portions of surfaces of teeth 10b of core blocks 10A that face the magnet block 13B.

Moreover, the rest of the configuration is formed in a similar or identical manner to that of Embodiment 2 above.

In Embodiment 3, because an expanded portion 13e that has an axial thickness that is similar or identical to that of a pair of flange portions 13d is formed on a radially inner end portion of a shaft portion 13b so as to link between the flange portions 13d, the volume of the magnet block 13B is increased by an amount proportionate to the expanded portion 13e compared to Embodiment 2 above. Thus, the amount of magnetic flux that is induced in the salient poles 4b and 5b of the first and second rotor cores 4 and 5 is increased, further increasing the rotational driving force that is generated in the first and second rotor cores 4 and 5.

Because recess portions 10d into which the expanded portion 13e is fitted are recessed into radially inner end portions of surfaces of teeth 10b of core blocks 10A that face the magnet block 13B, the magnet block 13B can be positioned on the core blocks 10A by fitting the expanded portion 13e into the recess portions 10d. Thus, positioning accuracy between the magnet block 13B and the core blocks 10A is improved.

Embodiment 4

Figure 15:
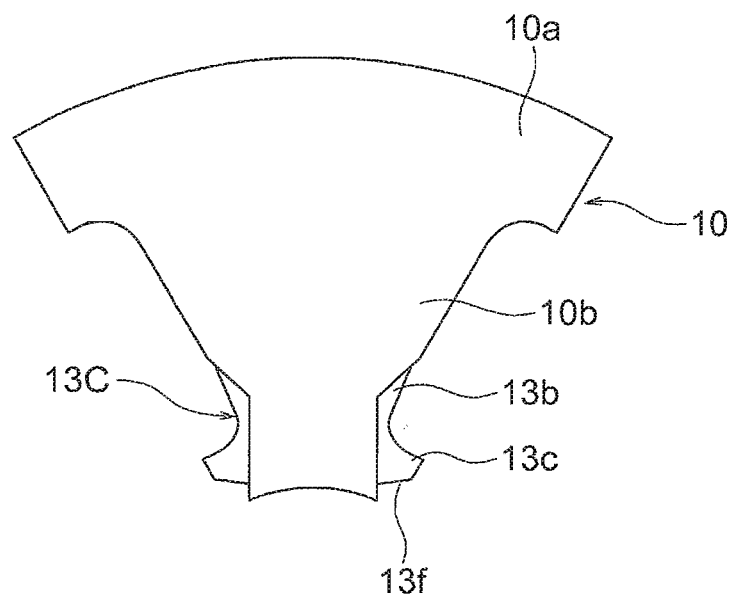
FIG. 15 is a plan that shows a state in which a magnet block and core blocks are stacked in a magnetic inductor electric motor according to Embodiment 4 of the present invention.

FIG. 15 is a plan that shows a state in which a magnet block and core blocks are stacked in a magnetic inductor electric motor according to Embodiment 4 of the present invention.

In FIG. 15, corner portions on radially inner sides of flange portions 13c of a magnet block 13C are beveled to form inclined surfaces 13f that displace radially outward circumferentially away from a shaft portion 13b.

Moreover, the rest of the configuration is formed in a similar or identical manner to that of Embodiment 1 above.

In Embodiment 4, because radially inwardly facing surfaces of flange portions 13c are formed into inclined surfaces 13f that displace radially outward circumferentially away from a shaft portion 13b, the occurrence of situations such as the flange portions 13c being damaged by contacting the coil assemblies 21 when inserting the magnet blocks 13C into the coil assemblies 21 is suppressed.

Embodiment 5

Figure 16:
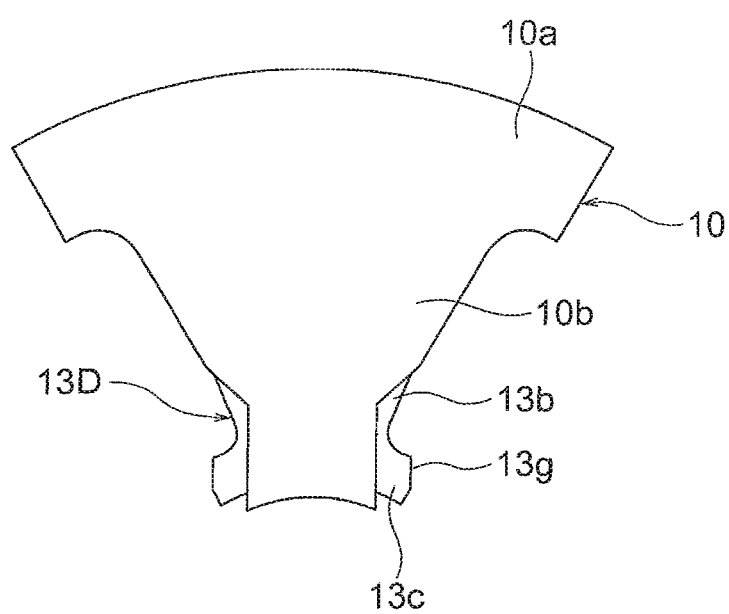
FIG. 16 is a plan that shows a state in which a magnet block and core blocks are stacked in a magnetic inductor electric motor according to Embodiment 5 of the present invention.

FIG. 16 is a plan that shows a state in which a magnet block and core blocks are stacked in a magnetic inductor electric motor according to Embodiment 5 of the present invention.

In FIG. 16, corner portions on radially outer sides of flange portions 13c of a magnet block 13D are beveled to form inclined surfaces 13g that displace radially outward toward a shaft portion 13b.

Moreover, the rest of the configuration is formed in a similar or identical manner to that of Embodiment 1 above.

In Embodiment 5, because radially outwardly facing surfaces of flange portions 13c are formed into inclined surfaces 13g that displace radially outward toward a shaft portion 13b, a circumferential width of the pair of flange portions 13c is narrower, suppressing the occurrence of situations such as the flange portions 13c being damaged by contacting the coil assemblies 21 when inserting the magnet blocks 13D into the coil assemblies 21.

Embodiment 6

Figure 17:
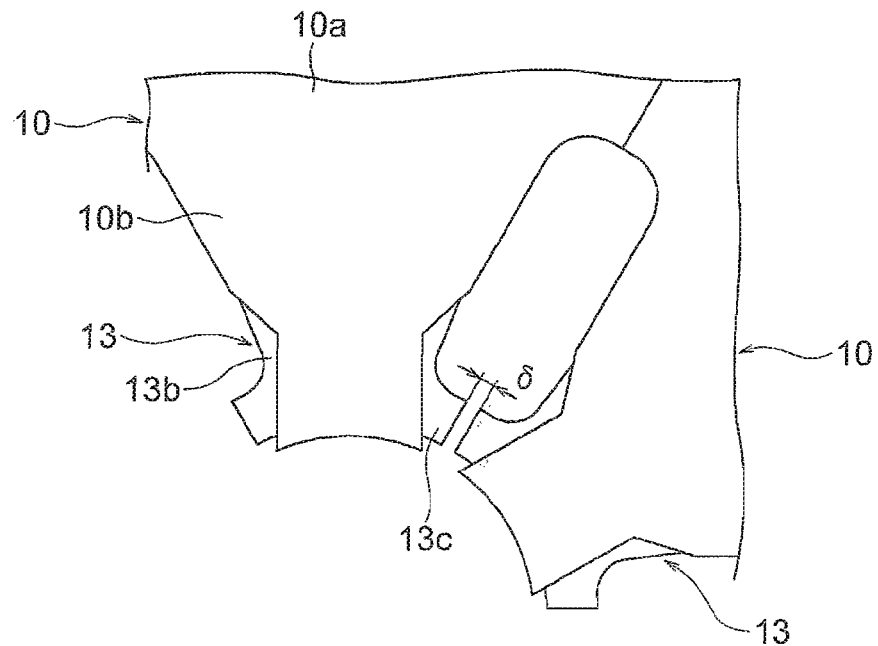
FIG. 17 is a plan that shows a state in which magnet blocks and core blocks are stacked in a magnetic inductor electric motor according to Embodiment 6 of the present invention.

FIG. 17 is a plan that shows a state in which magnet blocks and core blocks are stacked in a magnetic inductor electric motor according to Embodiment 6 of the present invention.

In FIG. 17, magnet blocks 13 are formed so as to have gaps 6 between adjacent flange portions 13c when stator assemblies 20 are arranged into an annular shape.

Moreover, the rest of the configuration is formed in a similar or identical manner to that of Embodiment 1 above.

In Embodiment 6, gaps 6 are formed between adjacent flange portions 13c of magnet blocks 13 when stator assemblies 20 are arranged into an annular shape. Thus, situations such as the flange portions 13c contacting and damaging each other when the stator assemblies 20 that are arranged into an annular shape are inserted into and fixed to the housing 14 are prevented.

Embodiment 7

Figure 18:
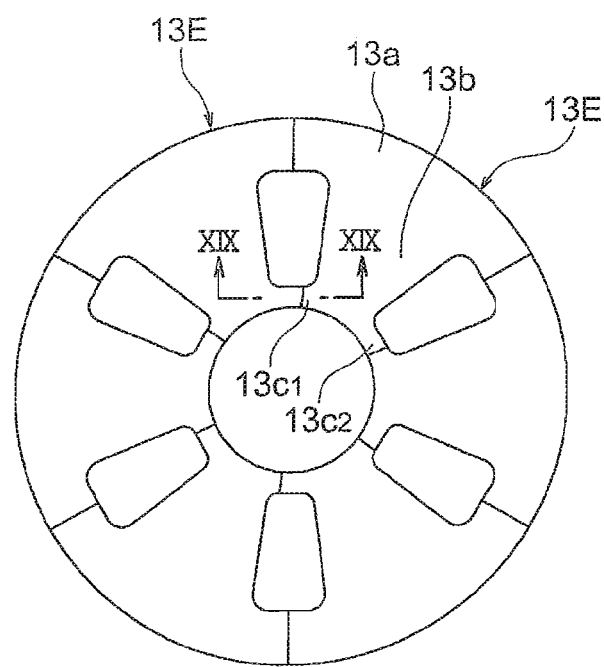
FIG. 18 is a plan that shows a state in which magnet blocks are arranged into an annular shape in a magnetic inductor electric motor according to Embodiment 7 of the present invention.
Figure 19:
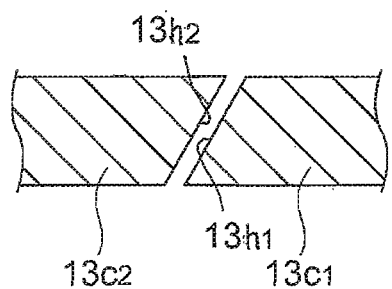
FIG. 19 is a cross section that is taken along Line XIX-XIX in FIG. 18 so as to be viewed in the direction of the arrows.

FIG. 18 is a plan that shows a state in which magnet blocks are arranged into an annular shape in a magnetic inductor electric motor according to Embodiment 7 of the present invention, and FIG. 19 is a cross section that is taken along Line XIX-XIX in FIG. 18 so as to be viewed in the direction of the arrows.

In FIGS. 18 and 19, circumferential side surfaces of flange portions 13c1 of magnet blocks 13E that protrude on a first circumferential side from radially inner end portions of shaft portions 13b are formed into inclined surfaces 13h1 in which the amount of protrusion from the shaft portions 13b gradually increases from a first axial side toward a second axial side, and circumferential side surfaces of flange portions 13c2 that extend outward on a second circumferential side from radially inner end portions of the shaft portions 13b are formed into inclined surfaces 13h2 in which the amount of protrusion from the shaft portions 13b gradually reduces from a first axial side toward a second axial side.

Moreover, the rest of the configuration is formed in a similar or identical manner to that of Embodiment 1 above.

In Embodiment 7, circumferential side surfaces of flange portions 13c1 and 13c2 that protrude on two circumferential sides from radially inner end portions of shaft portions 13b are respectively formed into inclined surfaces 13h1 and 13h2. Thus, gaps are formed between adjacent flange portions 13c1 and 13c2 of magnet blocks 13E when stator assemblies 20 are arranged into an annular shape. Situations such as the flange portions 13c1 and 13c2 contacting and damaging each other when the stator assemblies 20 that are arranged into an annular shape are inserted into and fixed to the housing 14 are thereby prevented. When the magnet blocks 13E are viewed from radially inside, radially inner end surfaces that include the shaft portions 13b and the flange portions 13c1 and 13c2 form parallelograms. Thus, compared to magnet blocks 13 in which the radially inner end surfaces are a rectangular shape when viewed from radially inside, the magnet blocks 13E are less likely to contact the coil assemblies 21 when being inserted into the coil assemblies 21, suppressing the occurrence of damage that results from contact with the coil assemblies 21.

Moreover, in Embodiment 7 above, circumferential side surfaces of flange portions 13c1 and 13c2 that protrude on two circumferential sides from radially inner end portions of shaft portions 13b are made into inclined surfaces 13h1 and 13h2 such that e radially inner end surfaces of the magnet blocks 13E form parallelograms when viewed from radially inside, but circumferential side surfaces of flange portions 13c1 and 13c2 that protrude on two circumferential sides from radially inner end portions of shaft portions 13b may be made into inclined surfaces such that the radially inner end surfaces of the magnet blocks form isosceles trapezoids when viewed from radially inside.

Embodiment 8

Figure 20:
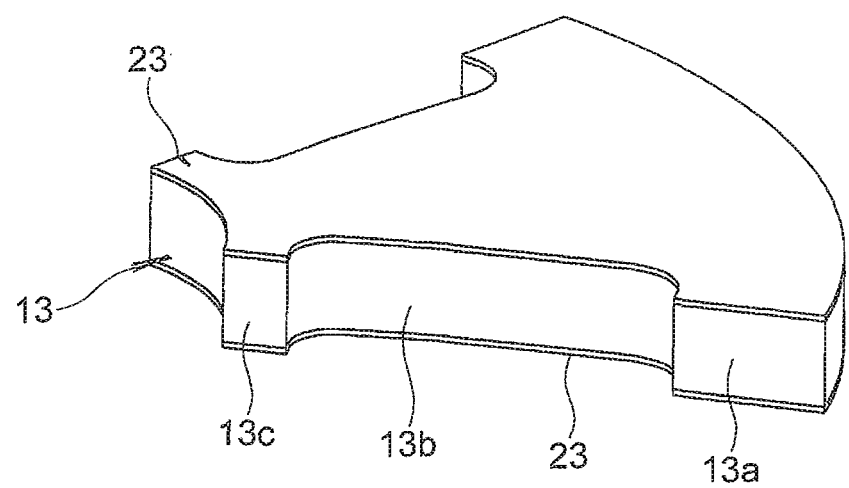
FIG. 20 is an oblique projection that shows a magnet block in a magnetic inductor electric motor according to Embodiment 8 of the present invention.

FIG. 20 is an oblique projection that shows a magnet block in a magnetic inductor electric motor according to Embodiment 8 of the present invention.

In FIG. 20, a protective member 23 is coated on two surfaces in an axial direction of a magnet block 13.

Moreover, the rest of the configuration is formed in a similar or identical manner to that of Embodiment 1 above.

In Embodiment 8, a protective member 23 is coated so as to cover two surfaces in an axial direction of a magnet block 13. Thus, even if a corner portion of a core block 10 contacts a magnet block 13 when the core blocks 10 are being inserted into a coil assembly 21 on the two sides of the magnet block 13, and the magnet block 13 is damaged, scattering of magnet powder is prevented by the protective member 23. In addition, the protective member 23 functions as a lubricant when the core blocks 10 are being inserted into the coil assembly 21 on the two sides of the magnet block 13, facilitating insertion of the core blocks 10, and improving assemblability of the stator block 20.

Here, it is desirable to use a highly permeable magnetic material in the protective member 23, because increasing the magnetic resistance between the core blocks 10 and the magnet block 13 is a factor that degrades motor characteristics. The protective member 23 is configured, for example, by forming the thin electromagnetic steel sheet that constitutes the material of the core blocks 10 so as to have a similar shape to the surface shape on the two sides of the magnet block 13 and fixing it to the two surfaces of the magnet block 13 using adhesive.

Moreover, in each of the above embodiments, concentrated winding coils are produced by winding a rectangular conductor into flatwise windings, but concentrated winding coils may be produced by winding a rectangular conductor into edgewise windings.

In each of the above embodiments, concentrated winding coils are produced using a rectangular conductor, but a conductor wire that has a circular cross section may be used in the concentrated winding coils.

In each of the above embodiments, the number of turns in the concentrated winding coils is four turns, but the number of turns in the concentrated winding coils is not limited to four turns, provided that it is greater than or equal to one turn.

Each of the above embodiments is configured such that base portions of adjacent magnet blocks contact each other, but magnet blocks may be configured such that base portions of adjacent magnet blocks are separated from each other. In that case, occurrences of cracking of the magnet blocks that result from the base portions contacting each other when the stator assembly is being arranged into an annular shape can be prevented.

In each of the above embodiments, insulators are mounted so as to be fitted over pairs of teeth that face each other axially, but insulators may be omitted. In that case, the coil assemblies are constituted only by the concentrated winding coils.

The invention claimed is:
1. A magnetic inductor electric motor comprising:
a housing that is produced using a nonmagnetic material;
a stator comprising:
a stator core that is configured such that a first stator core and a second stator core that are produced so as to have identical shapes in which a plurality of teeth are each formed so as to have a tapered shape in which a circumferential width becomes gradually narrower radially inward and are disposed at a uniform angular pitch circumferentially so as to project radially inward from an inner circumferential surface of a cylindrical core back are disposed coaxially so as to be separated axially and such that circumferential positions of said teeth are aligned, such that slots are configured into open slots; and a plurality of coils that are produced by winding a jointless, continuous conductor wire using a concentrated winding method on a pair of said teeth that face each other in an axial direction of said stator core, said stator being disposed inside said housing;

a rotor comprising a first rotor core and a second rotor core that are produced so as to have identical shapes in which salient poles are disposed so as to project at a uniform angular pitch circumferentially on an outer circumferential surface of a cylindrical base portion, said rotor being fixed coaxially to a rotating shaft such that said first rotor core is positioned on an inner circumferential side of said first stator core and said second rotor core is positioned on an inner circumferential side of said second stator core, and such that said first rotor core and said second rotor core are offset circumferentially by a pitch of half a salient pole from each other, said rotor being disposed rotatably inside said housing; and a permanent magnet that is disposed between said first stator core and said second stator core, and that generates field magnetic flux such that said salient poles of said first rotor core and said salient poles of said second rotor core have different polarity, wherein:

said first stator core and said second stator core are configured by arranging core block pairs into an annular shape such that circumferential side surfaces of circular arc-shaped core back portions contact each other, said core block pairs being configured by stacking together core blocks so as to be spaced apart axially, each of said core blocks comprising said core back portion and one of said teeth, which protrudes radially inward from an inner circumferential surface of said core back portion; and said permanent magnet is configured so as to be divided into a plurality of magnet blocks that each comprise:

a circular arc-shaped base portion;

one shaft portion that protrudes radially inward from an inner circumferential surface of said base portion; and flange portions that protrude on two circumferential sides from a radially inner end portion of said shaft portion, said magnet blocks being held between said core block pairs such that said base portion and said shaft portion are positioned inside said core block pairs and such that said flange portions protrude circumferentially from said core block pairs.

2. The magnetic inductor electric motor according to claim 1, wherein said flange portions are formed so as to be thicker than a thickness of said shaft portion.

3. The magnetic inductor electric motor according to claim 2, wherein:

an expanded portion is formed on an end portion near a tip end of said shaft portion so as to have a thickness that is similar or identical to that of said flange portions so as to link between said flange portions;

a recess portion is formed on a radially inner end portion of a surface of said teeth of said core blocks that faces said magnet block; and said magnet blocks are held between said core block pairs by fitting said expanded portion into said recess portion.

4. The magnetic inductor electric motor according to claim 1, wherein at least one of a radially inner corner portion and a radially outer corner portion of said flange portions is beveled to form an inclined surface.

5. The magnetic inductor electric motor according to claim 1, wherein two circumferential side surfaces of said flange portions are beveled to form inclined surfaces.

6. The magnetic inductor electric motor according to claim 1, wherein a gap is formed between circumferentially adjacent flange portions.

7. The magnetic inductor electric motor according to claim 1, wherein a protective member is coated onto two axial end surfaces of said magnet blocks.

8. The magnetic inductor electric motor according to claim 1, wherein said magnet blocks are produced such that a circumferential width Wmag and an axial length Hmag of a radially inner end surface thereof satisfy:

$$W\text{mag}+\{H\text{mag}\times(H\text{coil}/W\text{coil})\}<(W\text{coil}^2+H\text{coil}^2)^{1/2},$$

where Wcoil is a circumferential width and Hcoil is an axial length of a radially inner opening of said coils.

9. The magnetic inductor electric motor according to claim 1, wherein insulators are mounted so as to be fitted over said pairs of said teeth that face each other in said axial direction of said stator core, and said coils are wound onto said insulator.

10. A method for manufacturing the magnetic inductor electric motor according to claim 1, said method for manufacturing said magnetic inductor electric motor comprising steps of:

producing a coil assembly by winding said jointless, continuous conductor wire into a concentrated winding;

inserting said magnet block inside said coil assembly so as to be rotated so as to avoid interference between said flange portions and said coil assembly;

inserting one of said core blocks inside said coil assembly on a first side of said magnet block; and inserting another of said core blocks inside said coil assembly on a second side of said magnet block.

* * * * *